United States Patent [19]

Müller et al.

[11] 4,142,808
[45] Mar. 6, 1979

[54] TIRE CHAIN TENSIONING DEVICE

[75] Inventors: Anton Müller, Aalen-Unterkochen; Helmut Magiera, Aalen-Hofherrnweiler, both of Fed. Rep. of Germany

[73] Assignee: Eisen- und Drahtwert Erlau Aktiengesellschaft, Aalen, Fed. Rep. of Germany

[21] Appl. No.: 801,757

[22] Filed: May 31, 1977

[30] Foreign Application Priority Data

May 28, 1976 [DE] Fed. Rep. of Germany ....... 2623827

[51] Int. Cl.² .............................................. F16B 7/12
[52] U.S. Cl. .................................... 403/166; 152/217; 59/93
[58] Field of Search ................. 403/166, 152, 59; 152/217, 218, 219, 233, 241; 59/93; 308/63, 64; 285/286

[56] References Cited

U.S. PATENT DOCUMENTS

| 1,618,941 | 2/1927 | Meade | 152/219 X |
| 1,966,665 | 7/1934 | Gourley et al. | 59/93 X |
| 2,125,303 | 8/1938 | McRoberts | 403/166 X |
| 2,429,720 | 10/1947 | Holtz | 152/241 |
| 2,472,768 | 6/1949 | Carroll | 152/241 |
| 3,011,812 | 12/1961 | Warming | 403/157 |
| 3,343,858 | 9/1967 | Rice | 403/166 X |
| 3,411,837 | 11/1968 | Schellstede | 285/286 X |

Primary Examiner—Wayne L. Shedd
Attorney, Agent, or Firm—Walter Becker

[57] ABSTRACT

A tensioning device for a tire chain, which comprises a first link member adapted to receive a chain link, a second link member adapted to receive another chain link, and an intermediate member, e.g. in the form of a tubular member, which is connected to the first link member and is interposed between the first link member and the second link member. The second link member is movable relative to the intermediate member. A shaft member which is associated with the intermediate member is fixedly connected to the second link member while being movable relative to the first link member. Preloaded springs are associated with the intermediate member and continuously act upon the connecting member so as to urge the second link member in the direction toward the first link member.

16 Claims, 6 Drawing Figures

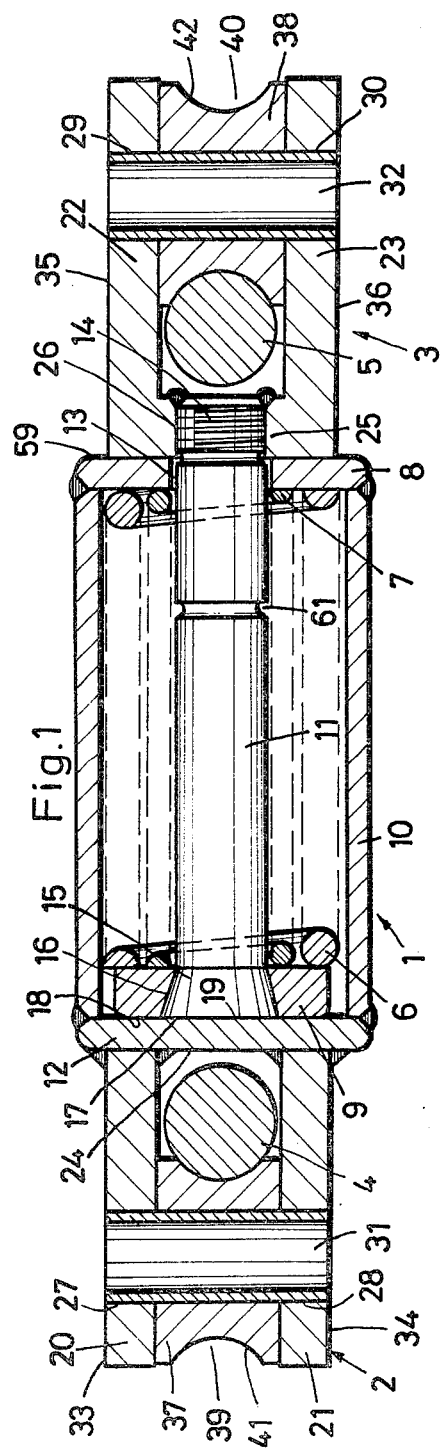
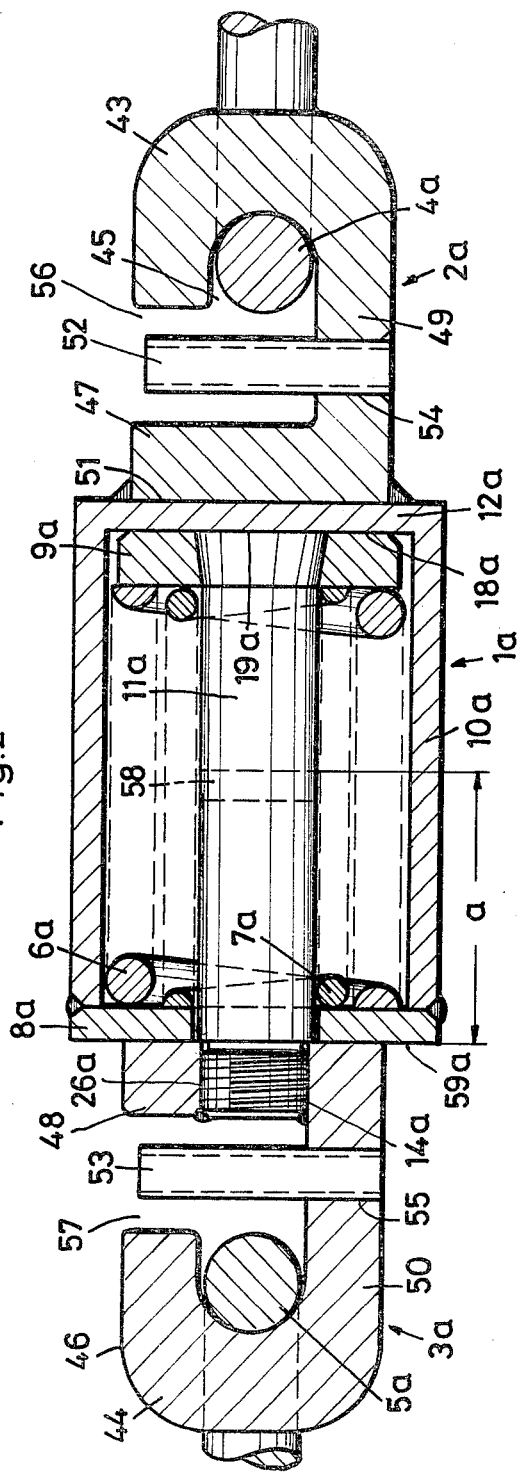
Fig.1
Fig.2

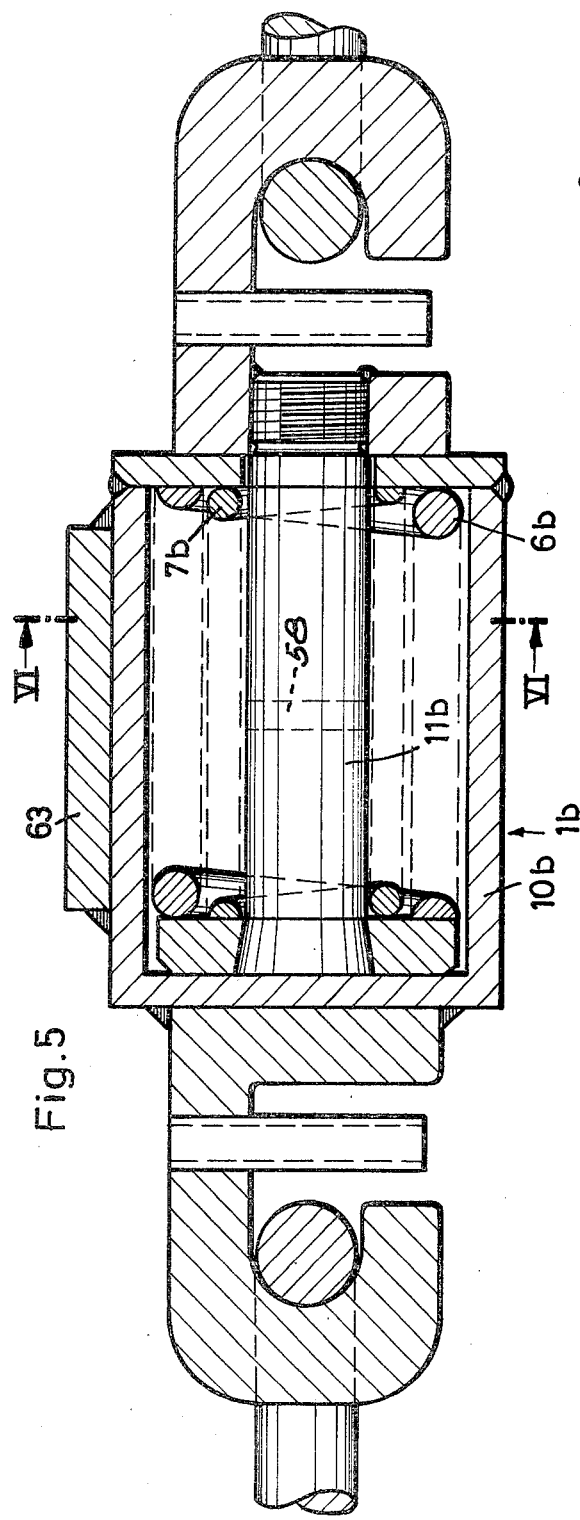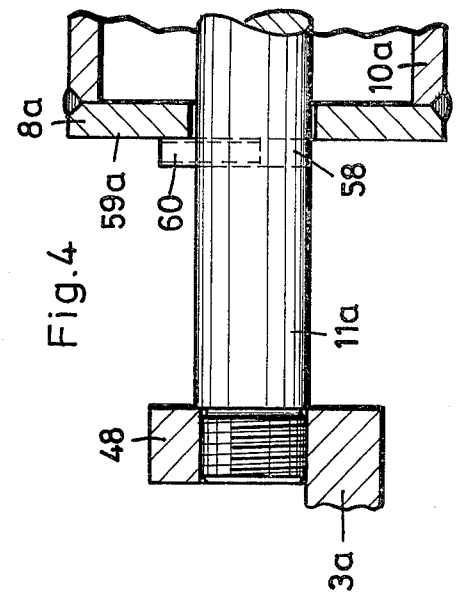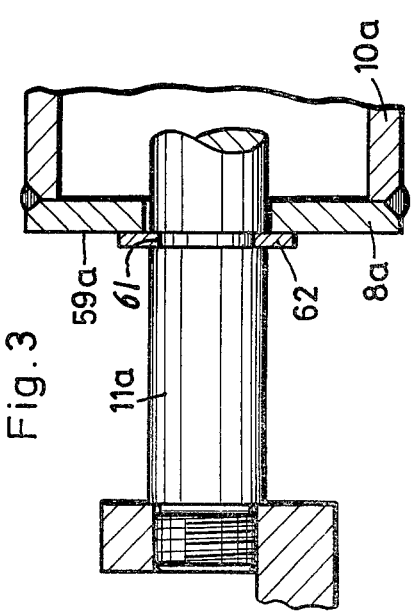

TIRE CHAIN TENSIONING DEVICE

The present invention relates to tire chains and is an improvement in or modification of the invention of our earlier copending U.S. patent application Ser. No. 696,080-Müller filed June 14, 1978, now abandoned and replaced by straight continuation application Ser. No. 885,386-Müller filed Mar. 10, 1978.

In the aforesaid earlier patent application there is described a tire chain having a tread part and side parts which have at least one tensioning device which for the tensioning of the tire chain in the operating state is linked to members of the tire chain with two link members movable resiliently against one another up to a stretched-out position, the link members of the tensioning device, approximately in the stretched-out position, being held in position relative to each other with a releasable locking means.

With the above mentioned tire chain, the link members of the tensioning device are moved into their stretched-out position before the tire chain is fitted and are then locked so that the tire chain can be fitted on to the tire without traction stressing being caused by the tensioning device. In order to achieve a high degree of tensioning and a large tensioning path or spring path, the tensioning device is comparatively long and cannot be used without trouble with narrow mesh tire chains in which the side of each mesh consists only of a few chain links.

It is an object of the present invention to provide a tire chain of the general type described above, which has a tensioning device suitable also for use in narrow mesh tire chains.

This object and other objects and advantages of the invention will appear more clearly from the following specification in connection with the accompanying drawings, in which:

FIG. 1 shows a longitudinal section through a tensioning device of a tire chain according to the invention.

FIG. 2 is a longitudinal section of another embodiment of a tensioning device according to the invention.

FIGS. 3 and 4 show in section a part of the tensioning device according to FIG. 2 with alternative means for locking the link members in a stretched-out position.

FIG. 5 illustrates in section a further form of a tensioning device according to the invention.

Figure 6:
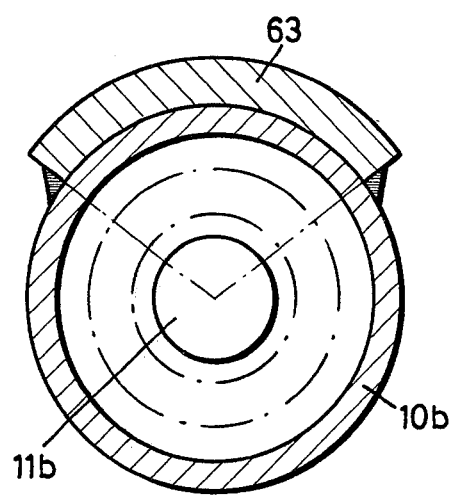
FIG. 6 is a section taken along the line VI — VI of FIG. 5.

The tire chain according to the invention is characterized primarily in that the tensioning device has at least two compression springs, the two ends of which are generally level with each other and are operatively connected to the link members.

Referring now to the drawings in detail, the tensioning device 1 shown in FIG. 1 has two link members 2 and 3 movable towards one another by means of which the tensioning device 1 is suspended in chain links 4 and 5 of a tire chain. The two link members 2 and 3 are movable in the direction towards one another against the force of two compression springs 6 and 7. The two compression springs 6 and 7 have their ends resting on counter bearings 8 and 9 which bearings are connected respectively to the link members 2 and 3 facing away from the appropriate ends of the compression springs 6, 7. The link members 2 and 3 are respectively connected by means of guide parts 10 and 11 to the appropriate counter bearings 8 and 9. The guide part 10 of the link member 2 is formed by a cylindrical housing which surrounds and is spaced from the guide part 11 of the other link member 3, which is formed as a shaft. The cylindrical housing 10 is closed at one end by a closure plate 12 which is welded to the housing 10. The other end of the housing 10 is closed by the counter bearing 8 which is formed as a ring and is likewise welded to the end of the housing. The shaft-like guide part 11 extends through the central opening 13 of the annular counter bearing 8, and in the position shown in FIG. 1 the part 11 projects through the opening 13 from the housing 10 with an end section 14 which is screw-threaded. The other end 15 of the shaft-like guide part 11 is widened conically and carries the counter bearing 9 which is also ring-shaped and has a corresponding conical opening 16. The counter bearing 9 is located on the shaft-like guide part 11 so that the flat front face 17 of the guide part 11 and the corresponding outer face 18 of the counter bearing 9 lie in one plane so that the shaft-like guide part in the position shown in FIG. 1 is supported satisfactorily via a comparatively large face on the inside 19 of the closure plate 12.

In the embodiment of FIG. 1, the shaft-like guide part 11 is surrounded by the two compression springs 6 and 7 which form helical compression springs. The compression spring 7 is surrounded by the other compression spring 6 over its entire length. The two compression springs 6, 7 lie inside the housing 10 and are thus supported by the shaft-like guide part 11 as well as also by the housing 10 over their entire length. Thereby in an advantageous manner the danger of bending of the compression springs is obviated so that a jamming of the two link members 2 and 3 against one another cannot occur. The pitch of the two compression springs is different. In this connection it is advantageous that the shaft-like guide part 11 has a constant cross section over its entire length surrounded by the compression springs so that the compression springs can be compressed and released without hindrance. The compression springs in the housing 10 are securely protected from contamination and from premature wear so that the tensioning device even after long use can ensure a satisfactory tensioning of the tire chain. Due to the special arrangement of the compression springs 6 and 7, the tensioning device 1 has only a short constructional length without the tensioning pressure being reduced thereby. In spite of its short constructional length the tensioning device has a high degree of tension pressure so that the tire chain can be tensioned satisfactorily and thus fits securely on the tire.

The use of compression springs for the tensioning device has the great advantage that these springs cannot be overloaded. With high loading of the springs their windings lie on one another and prevent a further loading likely to lead to destruction of the springs. The tensioning device can therefore be used to a certain extent wherever particularly strong stresses arise, for example, in tire chains used in mines or in quarries. Since the counter bearings 8, 9 are respectively arranged at the ends of the compression springs 6 and 7 which face away from the pertaining link members 2 and 3, and since the link members are displaceable towards each other, the tensioning device, in spite of its short constructional length, has a comparatively large adjustment stroke.

In the embodiment of FIG. 1, the two compression springs 6 and 7 surround the shaft-like guide part 11. It is also possible to arrange the compression springs in the region between the shaft-like guide part 11 and the housing wall diametrically opposite each other. If desired, a plurality of compression springs may also be used along a circle, at positions around the shaft-like guide part 11. In this way, also with a short constructional length of the tensioning device 1, a high tension pressure can be produced.

The two link members 2 and 3 are fork-shaped and have two legs 20 to 23 which are freely projecting and extend parallel to each other. The legs 20 and 21 of the link member 2 are of equal length and are welded directly onto the outer face 24 of the closure plate 12. The legs 22 and 23 of the other link member 3 are also of equal length and merge into one another via a bridge-piece 25 extending perpendicularly thereto. In the bridge-piece 25 there is provided a screw-threaded bore 26 so that the link member 3 can in a simple manner be screwed onto the end section 14 of the shaft-like guide part 11. In order to prevent an unintended loosening of the link member 3 from the guide part 11, the link member 3 may additionally be connected to the guide part 11 by welding. In both legs of each link member 2 and 3 there are provided aligned openings 27, 28 and 29, 30 respectively in which are respectively fastened cross pieces 31 and 32, in the embodiment shown clamping sleeves. The ends of the clamping sleeves 31, 32 are respectively located in those outer faces 33 to 36 of the legs 22, 23 which face away from each other. In the region between the two legs of each link member 2 and 3, wear pieces 37, 38 are respectively located on the clamping sleeve 31 and 32. These wear pieces are in the form of rollers and have a recess 39 and 40 respectively corresponding in cross section to the outer profile of the chain link 4, 5 to be suspended. Each recess extends around the whole periphery of the pertaining wear piece 37, 38. The chain links 4 and 5 respectively have their section which extends into the recess 39, 40 respectively engage the bottom surfaces 41, 42 over the entire width of the respective recess. The width of the wear piece 37 and 38 respectively corresponds to the inner spacing between the legs of the two link members 2 and 3 so that the wear piece cannot be displaced on the clamping sleeve 31 and 32 respectively. Since the chain links 4 and 5 suspended in the link members 2, 3 are located in the recesses 39 and 40 of the wear pieces 37 and 38 and, inasmuch as the wear pieces are non-displaceably mounted on the clamping sleeves 31 and 32, the chain links 4 and 5 cannot change their position in relation to the link members 2 and 3. As a result thereof the traction force exerted by the chain links always acts approximately in the direction of the longitudinal axis of the tensioning device 1 so that the latter is loaded uniformly when in operation. This also brings about the advantage that the shaft-like guide part 11 in the pulled-out position will not tilt relative to the housing 10 which otherwise could lead to an adverse effect on the tension action of the tensioning device. The link members 2 and 3 are protected against premature wear to a large extent by the wear pieces 37 and 38 respectively. The distance of the tension sleeves 31 and 32 respectively from the free leg ends and the diameters of the wear pieces 37 and 38 respectively are so selected that the suspended chain links 4 and 5 respectively, as shown in FIG. 1, are also spaced apart from the closure plate 12 of the housing 10 and from the bridge piece 25 of the connecting member 3 so that the mobility of the suspended chain links 3 and 5 is not obstructed. Furthermore, the wear pieces 37 and 38 do not project beyond the legs 20, 21 and 22, 23 of the two link members 2 and 3.

In the embodiment according to FIGS. 2 to 4, the cylindrical housing 10a is cup-shaped. With this construction, instead of the closure plate 12 according to FIG. 1, the housing 10a is provided with a bottom 12a. The two link members 2a and 3a of the tensioning device 1a are hook-shaped. The chain members 4a and 5a to be suspended of the tire chain are located in the suspension openings 45 and 46 bounded the hooks 43, 44 of the two link members 2a and 3a. The two link members 2a and 3a are respectively provided with supporting parts 47 and 48 which extend perpendicularly to the legs 49 and 50 respectively of the link members 2a and 3a respectively, forming parts of the hooks 43, 44 respectively, and are formed in one piece with said hooks. With these supporting parts 47, 48 two link members 2a and 3a can be fixed simply to the appropriate guide parts 10a and 11a. The supporting part 47 of the link member 2a is with its flat side 51 welded onto the outside of the bottom 12a of the housing 10a. The supporting part 48 of the link member 3a has over about half its length a screw-threaded bore 26a so that the link member in a simple manner can be screwed onto the threaded end section 14a of the likewise shaft-like formed guide part 11a. For securing the suspended chain links 4a and 5a against unintended dropping out from the suspension openings 45, 46 respectively of the two link members 2a and 3a, securing members 52 and 53 respectively are provided which are fixed in openings 54, 55 respectively in the legs 49, 50 respectively. The securing members are advantageously clamping pins which are first loosely inserted into the openings 54 and 55 respectively and, only after the suspension of the chain links 4a and 5a in the link members 2a and 3a, are hammered into the openings 54 and 55.

The securing members 52, 53 extend perpendicularly to the legs 49 and 50 of the two link members and project as far as the gaps 56 and 57 formed between the free end of the hooks and the supporting parts 47, 48. Since furthermore the diameters of the securing members 52, 53 are smaller than the widths of the link members 2a and 3a, the securing members are protected securely in operation against damage and wear. The tensioning device according to FIGS. 2 to 4 is moreover formed the same as the tensioning device according to FIG. 1.

In order that the tire chain with the tensioning devices may be mounted onto the tire in a simple and rapid manner, the tensioning device prior to applying the tire chain onto the tire may be extended and secured in this extended position. For this purpose, in the shaft-like guide part 11a there is provided a passage opening 58 which is arranged approximately midway along the length of the guide part. The distance a of this passage opening 58 from the outer face 59a of the counter bearing 8a is equal to the shortest spring stroke of one of the two compression springs 6a, 7a. The passage opening 58 in the position of the guide part 11a shown in FIG. 2, is located inside the housing 10a. Prior to applying the tire chain, the two link members 2a, 3a are displaced towards one another until the passage opening lies outside the housing 10a (FIG. 4). Then, a bolt may be placed into the passage opening 58 so that the link member 3a is secured against displacement. The bolt 60 will then, under the force of the two compression springs 6a, 7a which in the position of the link member 3a shown in FIG. 4 are tensioned, rest against the outer face 59a of the counter bearing 8a. After the tensioning device has been secured in its stretched out or extended position, the tire chain can in a simple and rapid manner be mounted on the tire without subjecting the side part to pull stresses. After the tire chain has been properly mounted on the tire, the locking means is released so that the link members of the tensioning device under the force of the two springs 6a, 7a move in the direction towards one another until the side part and thus the tire chain is tensioned. The bolt 60 can be easily inserted into and subsequently removed from the passage opening 58.

FIG. 3 shows a further locking possibility. Instead of the passage opening 58, the shaft-like guide part 11a may also be provided with an annular groove 61 as shown in FIG. 1 for the guide part 11. This annular groove likewise is spaced from the outer face 59 of the counter bearing 8 by a distance which at the most equals the shortest spring stroke of one of the two compression springs 6, 7. In this way, it is ensured that the annular groove 61, at least with completely tensioned compression springs, emerges from the housing 10 and 10a respectively so that e.g. a circlip long ring 62 can be inserted into said annular groove. Under the force of the two springs, this circlip lock ring 62 then likewise engages the outer face 59 and 59a respectively of the counter bearing 8 and 8a of the tensioning device and secures the tensioning device in the stretched-out position. After the mounting of the tire chain, ring 62 is again removed so that the two link members due to the force of the compression springs are moved in the direction towards one another until the tire chain is tensioned.

In the shortest position of the tensioning device, the link member 3, 3a respectively engages the outer face 59 and 59a respectively of the counter bearing 8 and 8a respectively as shown in FIGS. 1 and 2. Furthermore, the shaft-shaped guide part has its end face, and the counter bearing 9 and 9a has its outer surface 18, 18a engage the inner surface 19 of the closure plate 12, and the inner face 19a respectively of the housing bottom 12a.

Due to wear of the chain links on their contacting areas, the tire chain becomes widened after a certain period of use. The tensioning device according to the invention continually re-tensions the tire chain so that always a satisfactory seating of the tire chain on the tire will be assured. Overloading of the tire chain which for example may be brought about by jerky movements due to turning of the vehicle wheels, changes in the angle of attack of the vehicle wheels, are obviated as the parts of the tire chain provided with the resilient tensioning device are stretched elastically and can yield with the loads. By a suitable arrangement of the tensioning device, the tire chain may also be prevented from lifting off from the tire due to centrifugal force and from becoming damaged. In the tire chain there may be arranged several tensioning devices each of which may be locked individually during the mounting of the tire chain. In accordance with the number of tensioning devices which are unlocked after the mounting of the tire chain, the tensioning of the tire chain may be determined.

The tensioning device may be arranged on the inner and/or outer side part and/or on a center chain of a double row chain lying between two tread parts. As tire chain with two tread parts is provided for twin wheels in which a respective tread part rests on the two tires.

With such a tire chain, the tensioning devices may also be arranged next to one another between the two treads on two adjacent lying middle chains or the like, so that adjacent to the two tire flanks facing each other there is located at least one tensioning device. When the entire possible tensioning stroke of the tensioning devices upon subsequent re-tensioning of the tire chain has been utilized, at least one tensioning device may be removed from the tire chain and replaced by a shorter chain link. As a result thereof, the diameter of the pertinent part of the tire chain will be reduced to such an extent that the remaining tensioning devices can again be used for re-tensioning.

FIGS. 5 and 6 show an embodiment of a tensioning device according to the invention which, for example, may be used on the outside part of the tire protection chain. This tensioning device 1b is formed substantially the same as the tensioning device 1a according to FIGS. 2 to 4. Onto the casing of the cylindrical housing 10b which surrounds the two compression springs 6b and 7b as well as the shaft-like guide part 11b there is firmly welded a wear part 63 which extends in the peripheral direction of the housing 10b over an angle range of, for example, about 105°. In the embodiment shown in FIG. 5, the wear part 63 has a constant thickness over its entire width and extends almost over the entire length of the housing 10b. Due to the wear part 63, the housing 10b is to a high degree protected so that the useful life span of the tensioning device 1b is substantially prolonged. The tensioning device arranged on the outside part of the tire chain is easily accessible and, therefore, can be serviced without difficulties. In addition to absorbing the enormous centrifugal forces by the outer and inner side parts of the tire chain, the tensioning device 1b may, for example, also be employed in the middle part of a double tire chain. The wear part 63 may, of course, also have any other suitable shape.

As will be seen from the above, the tensioning devices of FIGS. 1 to 6 consist of simple structural parts which may be assembled rapidly and simply. Both compression springs in the tensioning device are respectively supported on common counter bearings. The tensioning devices may be locked rapidly and simply in their stretched-out position and can again be unlocked after the mounting of the tire chain has been completed. The tensioning devices are suitable in particular for tire protection chains which provide an armor-like protection of the tire against damage due to road conditions. Such tire chains are, for example, used in mining operations in which the tires may be damaged easily by the rocky ground.

As will further be evident from the above, with the construction of the present invention, the tensioning device need have only a short length and can therefore be used in narrow mesh tire chains or in tire chains with small spacing, as for example, with tire chains having a bridge-piece-ring system. With the use of at least two compression springs the tensioning device according to the invention can in spite of a short constructional length thereof, produce a comparatively high degree of tensioning so that the tire chain, when fitted, can be satisfactorily tensioned and can be located securely on the tire. With the aforementioned detachable locking, the tensioning device can be secured in its stretched-out position before fitting the tire chain on the tire so that the tire chain, in spite of the high degree of tensioning can be easily fitted onto the tire.

It is, of course, to be understood that the present invention is, by no means, limited to the specific showing in the drawing, but also comprises any modifications within the scope of the appended claims.

What we claim is:

1. In a tensioning device for a tire chain having two link pieces serving for joining members of the tire chain having therewith a housing including a guide part, a pair of pressure springs having ends installed in said housing and securely positioned by said guide part for movement against each other as far as into an extended positioning as well as supported against counter bearings therewith, one of the counterbearings being arranged against ends of said pressure springs away from the link pieces, releasable arresting means to hold the link pieces in extended positioning, the improvement in combination therewith comprising said ends of both pressure springs being located substantially at equal level at a time, said ends of the pressure springs having counter bearings arranged in common therewith which are remote from the link pieces belonging thereto, securing means provided to hold the arresting means on the guide part for the pressure springs, and an arresting face surface on the housing with which said securing means cooperates as well as at least one receiving means arranged on the guide part.

2. A tensioning device in combination according to claim 1 in which one counter bearing is a ring seated upon the guide part.

3. A tensioning device in combination according to claim 2 in which said ring is screwed upon said guide part.

4. A tensioning device in combination according to claim 1 in which one pressure spring is surrounded by the other pressure spring.

5. A tensioning device in combination according to claim 1 in which spacing of the receiving means from said arresting face surface is at most equal to smallest spring path of one of said pressure springs.

6. A tensioning device in combination according to claim 5 in which the receiving means is a through passage provided in said guide part.

7. A tensioning device in combination according to claim 5 in which the receiving means is an annular groove provided in said guide part.

8. A tensioning device in combination according to claim 1 in which both pressure springs have differing pitch.

9. A tensioning device in combination according to claim 1 in which said link pieces have two freely projecting fork-formed legs extending parallel to each other, and tension sleeve means in a region between said legs connecting the same relative to each other as a connection web engagement by chain members of the tire chain.

10. A tensioning device in combination according to claim 9 in which a wear piece surrounds said tension sleeve means and includes a matching recess around cross-section of an outer profile of one of the tire chain members engageable therewith.

11. A tensioning device in combination according to claim 9 in which a bridge piece interconnects said legs of one of said link pieces connected with the guide part threaded correspondingly into engagement with said bridge piece.

12. A tensioning device in combination according to claim 1 in which the link pieces are hook-formed defining an engagement opening therewith, and at least one securing member to close the opening.

13. A tensioning device in combination according to claim 10 in which said securing member is a tensioning pin to be fastened in an opening of a portion of a hook forming leg.

14. A tensioning device in combination according to claim 10 in which at least one of said link pieces has a supporting part having a threaded bore in which a corresponding end of the guide part is provided, said supporting part being located parallel to said securing member.

15. A tensioning device in combination according to claim 1 in which a wear part is fastened upon the housing and extends over an annular range of at least approximately 105° peripherally over the housing.

16. A tensioning device in combination according to claim 15 in which said wear part extends over approximately the entire length of the housing.

* * * * *

UNITED STATES PATENT OFFICE
CERTIFICATE OF CORRECTION

Patent No. 4,142,808　　　　　　　　Dated March 6, 1979

Inventor(s) Anton Müller et al

It is certified that error appears in the above-identified patent and that said Letters Patent are hereby corrected as shown below:

[73]　Assignee:　Eisen- und Drahtwerk Erlau
　　　　　　　　　Aktiengesellschaft, Aalen, Fed. Rep.
　　　　　　　　　of Germany

*Signed and Sealed this*

*Seventeenth Day of July 1979*

[SEAL]

*Attest:*

LUTRELLE F. PARKER
*Attesting Officer*　　*Acting Commissioner of Patents and Trademarks*